US011807973B2

(12) United States Patent
Masters, Jr.

(10) Patent No.: US 11,807,973 B2
(45) Date of Patent: Nov. 7, 2023

(54) COMBINATION WASHER/DRYER WITH A LINT SCREEN

(71) Applicant: Whirlpool Corporation, Benton Harbor, MI (US)

(72) Inventor: Roy Edward Masters, Jr., Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 422 days.

(21) Appl. No.: 17/094,360

(22) Filed: Nov. 10, 2020

(65) Prior Publication Data

US 2022/0145508 A1 May 12, 2022

(51) Int. Cl.
*D06F 25/00* (2006.01)
*B01D 46/00* (2022.01)
*B01D 46/10* (2006.01)
*D06F 39/14* (2006.01)
*D06F 58/04* (2006.01)
*D06F 58/22* (2006.01)

(52) U.S. Cl.
CPC ........... *D06F 25/00* (2013.01); *B01D 46/001* (2013.01); *B01D 46/0012* (2013.01); *B01D 46/0041* (2013.01); *B01D 46/10* (2013.01); *D06F 39/14* (2013.01); *D06F 58/04* (2013.01); *D06F 58/22* (2013.01); *B01D 2279/35* (2013.01)

(58) Field of Classification Search
CPC .......... D06F 25/00; D06F 39/14; D06F 39/12; D06F 39/00; D06F 58/04; D06F 58/22; D06F 58/02; D06F 58/20; B01D 46/001; B01D 46/0012; B01D 46/0041; B01D 46/10; B01D 2279/35

USPC ........................................................... 34/596
See application file for complete search history.

(56) References Cited

U.S. PATENT DOCUMENTS

| 7,412,853 | B2 * | 8/2008 | Hong ..................... D06F 25/00 68/20 |
| 7,520,145 | B2 | 4/2009 | Hong et al. |
| 7,707,858 | B2 | 5/2010 | Jeon et al. |
| 7,707,860 | B2 | 5/2010 | Hong et al. |
| 10,094,065 | B2 | 10/2018 | Kim et al. |
| 2004/0221474 | A1 | 11/2004 | Slutsky et al. |
| 2006/0075577 | A1 | 4/2006 | Jeong et al. |

(Continued)

FOREIGN PATENT DOCUMENTS

| EP | 1669487 A1 | 6/2006 |
| EP | 2843100 A1 | 3/2015 |

(Continued)

OTHER PUBLICATIONS

European Search Report for EP21204866, dated Mar. 22, 2022 (65 Pages).

*Primary Examiner* — John P McCormack
(74) *Attorney, Agent, or Firm* — Harness, Dickey & Pierce, PLC

(57) ABSTRACT

The airflow exhaust system for a combination washer/dryer includes an exit duct portion to couple with an exit from a tub. A lint screen box portion is associated with the exit duct. A transition duct portion is associated with the lint screen box portion. A fan is associated with the transition duct. The fan includes an outlet to couple with an exhaust tube. A mounting assembly stationarily fastens the airflow exhaust system within a housing of the combination washer/dryer machine.

14 Claims, 5 Drawing Sheets

(56) References Cited

U.S. PATENT DOCUMENTS

| | | | |
|---|---|---|---|
| 2006/0086001 A1 | 4/2006 | Jeong et al. | |
| 2006/0096335 A1 | 5/2006 | Park et al. | |
| 2006/0191247 A1* | 8/2006 | Thaler | B01D 46/0013 55/523 |
| 2012/0005915 A1* | 1/2012 | Song | D06F 58/203 34/132 |
| 2012/0144687 A1* | 6/2012 | Yeom | D06F 58/22 34/82 |
| 2015/0020399 A1* | 1/2015 | Bae | D06F 58/20 34/82 |
| 2015/0292134 A1* | 10/2015 | Dale | D06F 25/00 8/137 |
| 2021/0189636 A1* | 6/2021 | Rios Acebal | D06F 39/088 |

FOREIGN PATENT DOCUMENTS

| | | | |
|---|---|---|---|
| GB | 1461073 A | | 1/1977 |
| GB | 2044297 A | | 10/1980 |
| JP | 4236678 B2 | | 3/2009 |
| JP | 2009125453 A | * | 6/2009 |
| WO | WO-2019-192879 A1 | | 10/2019 |

\* cited by examiner

COMBINATION WASHER/DRYER WITH A LINT SCREEN

FIELD

The present disclosure relates to a combination washer/dryer machines and, more particularly, to a washer/dryer machine with a lint screen in a stationary exhaust system.

BACKGROUND

In current combination washing/drying machines, in order to attach components to the outside of the washing/drying chamber, flexible piping is required. The piping connects to a fixed venting connection of the dwelling. The washing/drying chamber is suspended by a mass, spring, damper system to reduce the vibration of the cabinet. Accordingly, this necessitates flexible piping to compensate for the movement of the suspended washing/drying chamber. Thus, this provides a flexible movable venting system within the machine housing or cabinet.

Accordingly, having the flexible piping within the cabinet can lead to undesirable noise and movement within the cabinet. Thus, the flexible piping is susceptible to hitting against various components that generates noise. Also, the contact, over time, may wear the exhaust piping components causing a potential leakage within the cabinet.

Accordingly, it would be desirable to have an exhaust system that is stationarily positioned within the cabinet. Having a stationary positioned exhaust system eliminates noise of the piping hitting against various components. Also, by fixing the exhaust system in the cabinet, a possibility of wear is substantially eliminated. Thus, the piping exhaust system is not moving and therefore reduces the chance of leakage within the cabinet.

SUMMARY

Accordingly to a first object of the disclosure, an airflow exhaust subsystem for a combination washer/dryer comprises an exit duct coupling with an exhaust exit opening in a tub. A lint screen box is coupled with the exhaust duct. A transition duct is coupled with the lint screen box. A fan includes or is coupled with the transition duct. The fan includes an outlet for coupling with an exhaust tube to outside the housing. A mounting assembly stationarily fastens the airflow exhaust system with the housing of the combination washer/dryer. The mounting assembly further comprises fasteners for coupling the airflow exhaust system with a frame member coupled with the housing. The lint screen box is secured to the frame member via fasteners adjacent a front of the combination washer/dryer machine. The intermediate duct is secured to the frame member via the fasteners. The fan is secured in position by the coupling with the intermediate duct and the exhaust tube.

The combination washer/dryer machine comprises a housing defining a cavity for receiving washer/dryer components including a drum and a tub positioned in the housing. A door is coupled with the housing enabling access to the drum. An airflow exhaust system is coupled with the combination washer/dryer. It comprises an exit duct coupling with an exhaust exit opening in the tub. A lint screen box is coupled with the exhaust duct. A transition duct is coupled with the lint screen box. A fan includes or is coupled with the transition duct. The fan includes an outlet for coupling with an exhaust tube. A mounting assembly stationarily fastens the airflow exhaust system with the housing. The mounting assembly further comprises fasteners for coupling the airflow exhaust system with a frame member coupled with the housing. The lint screen box is secured to the frame member via fasteners adjacent a front panel of the combination washer/dryer machine. The intermediate duct is secured to the frame member via the fasteners. The fan is secured in position by coupling with the intermediate duct and the exhaust tube.

A frame structure is positioned in the housing. The housing includes a plurality of panels secured to the frame structure. The door is positioned on one of the panels. The door defines a front of the combination washing/drying machine. The lint screen clean out is removable from the front of the combination washing/drying machine. The exhaust tube extends from one of the panels opposing the door.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
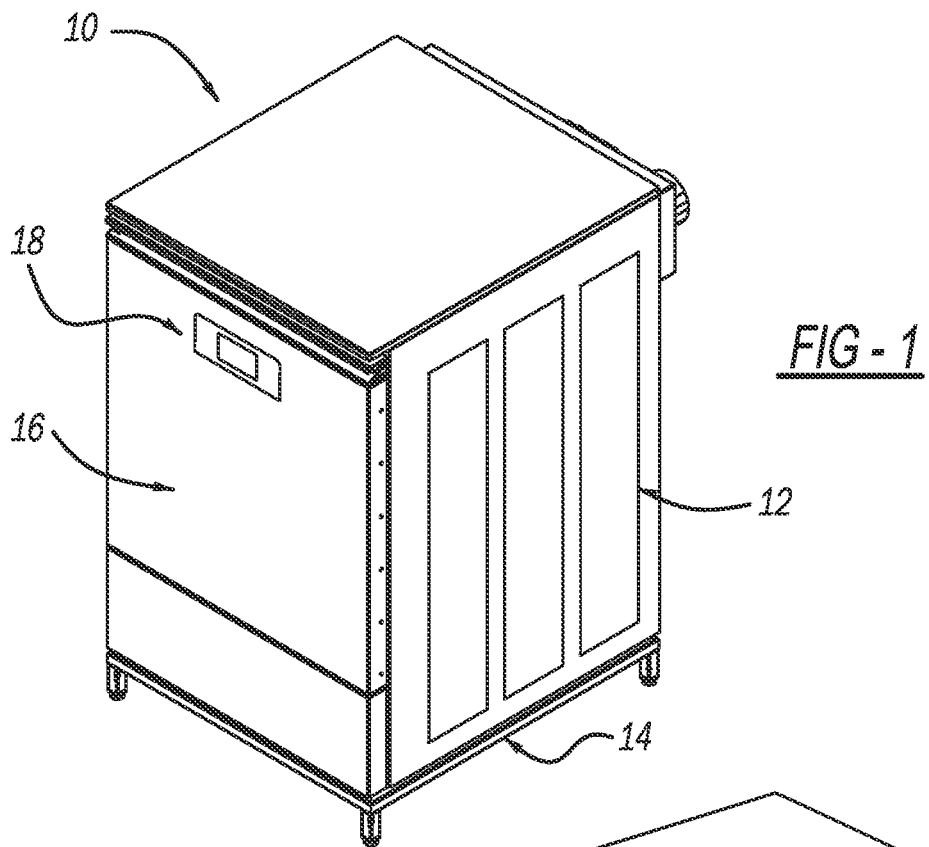
FIG. 1 is a perspective view of a combination washer/dryer machine in accordance with the disclosure.
Figure 2:
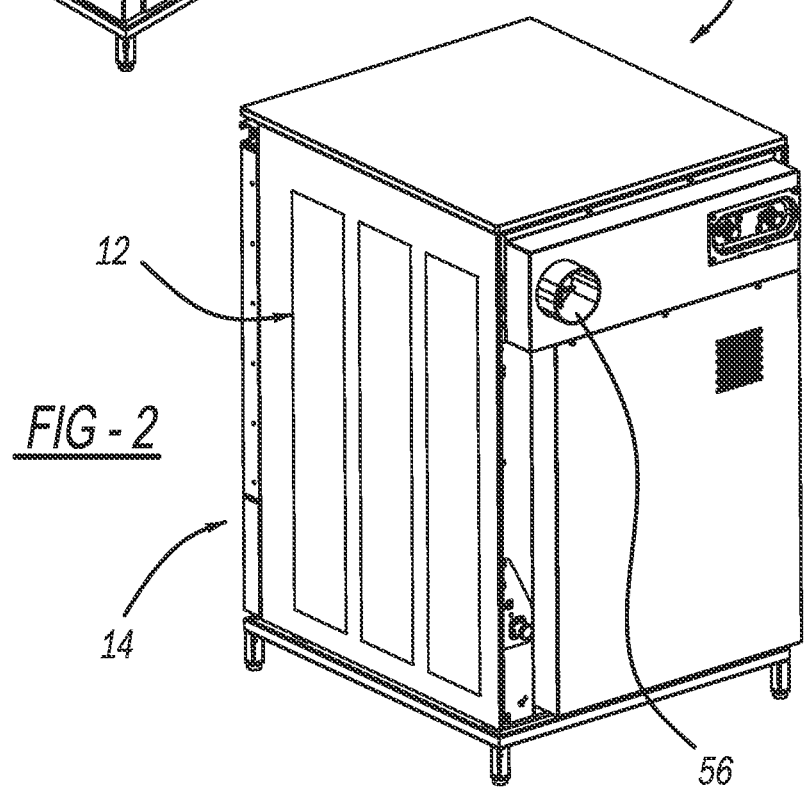
FIG. 2 is a perspective rear view of the combination washer/dryer machine of FIG. 1.
Figure 3:
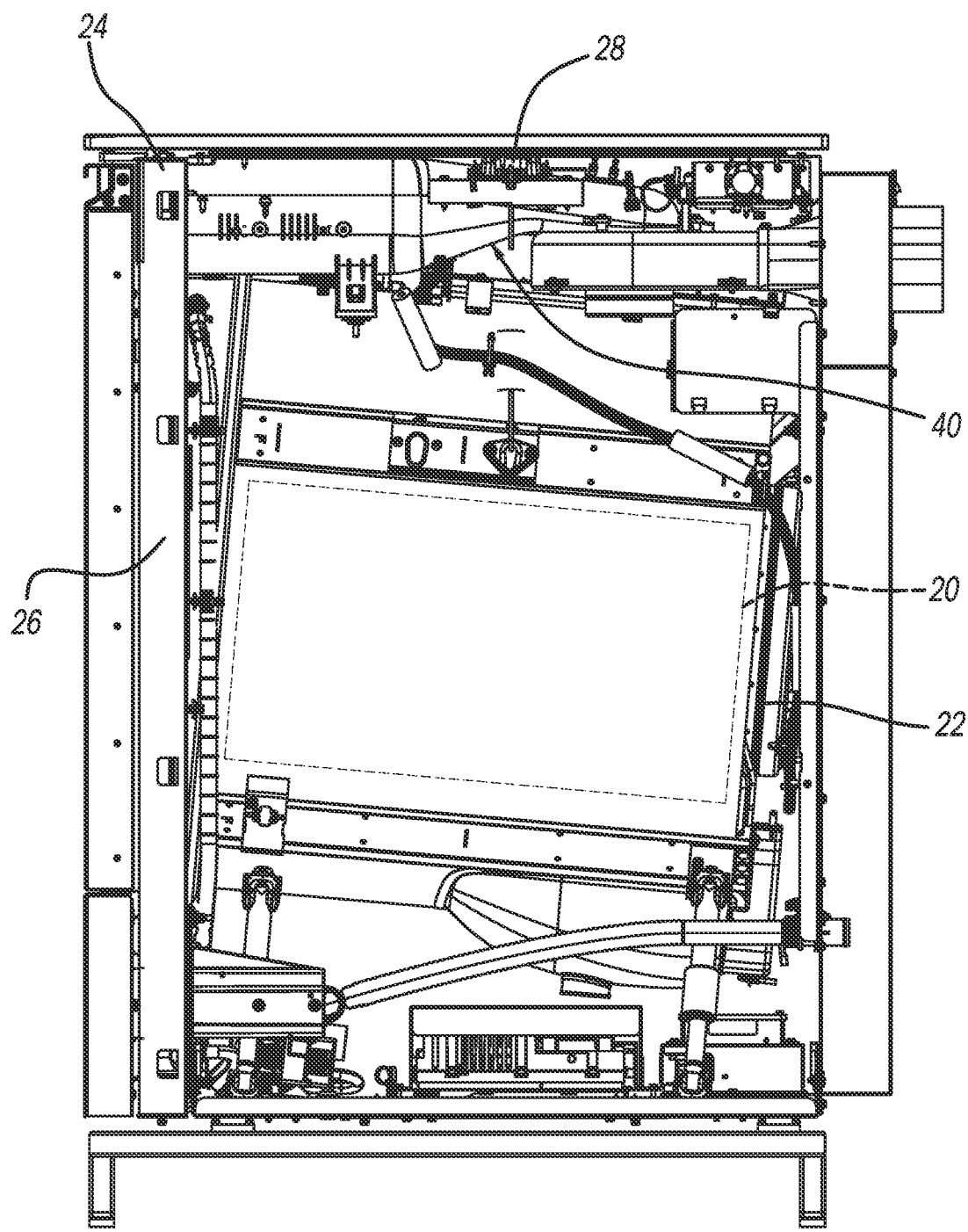
FIG. 3 is an elevation side view of the combination washer/dryer machine of FIG. 1 with a panel removed.
Figure 4:
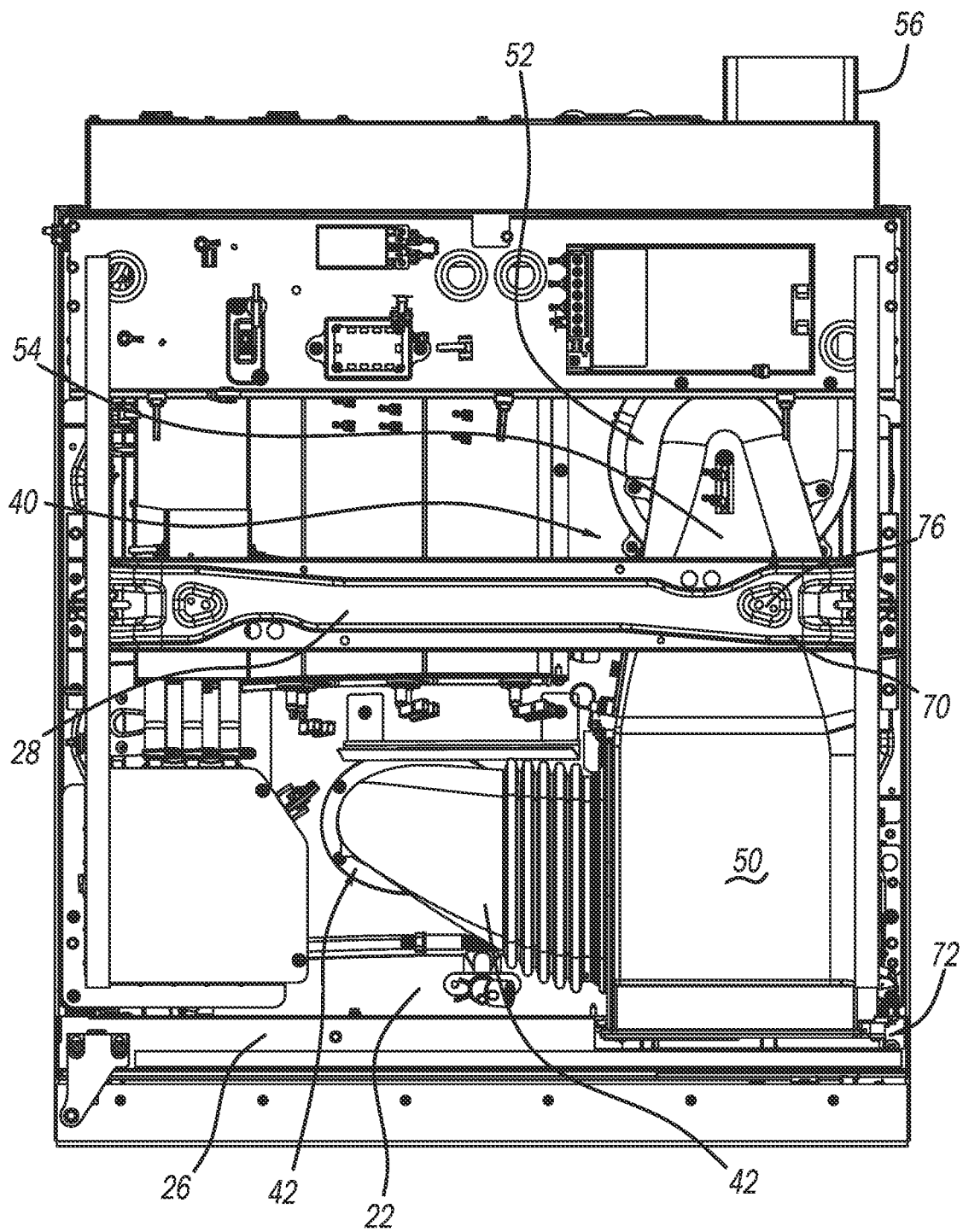
FIG. 4 is a top plan view of the washer/dryer machine of FIG. 1 with the panel removed.
Figure 5:
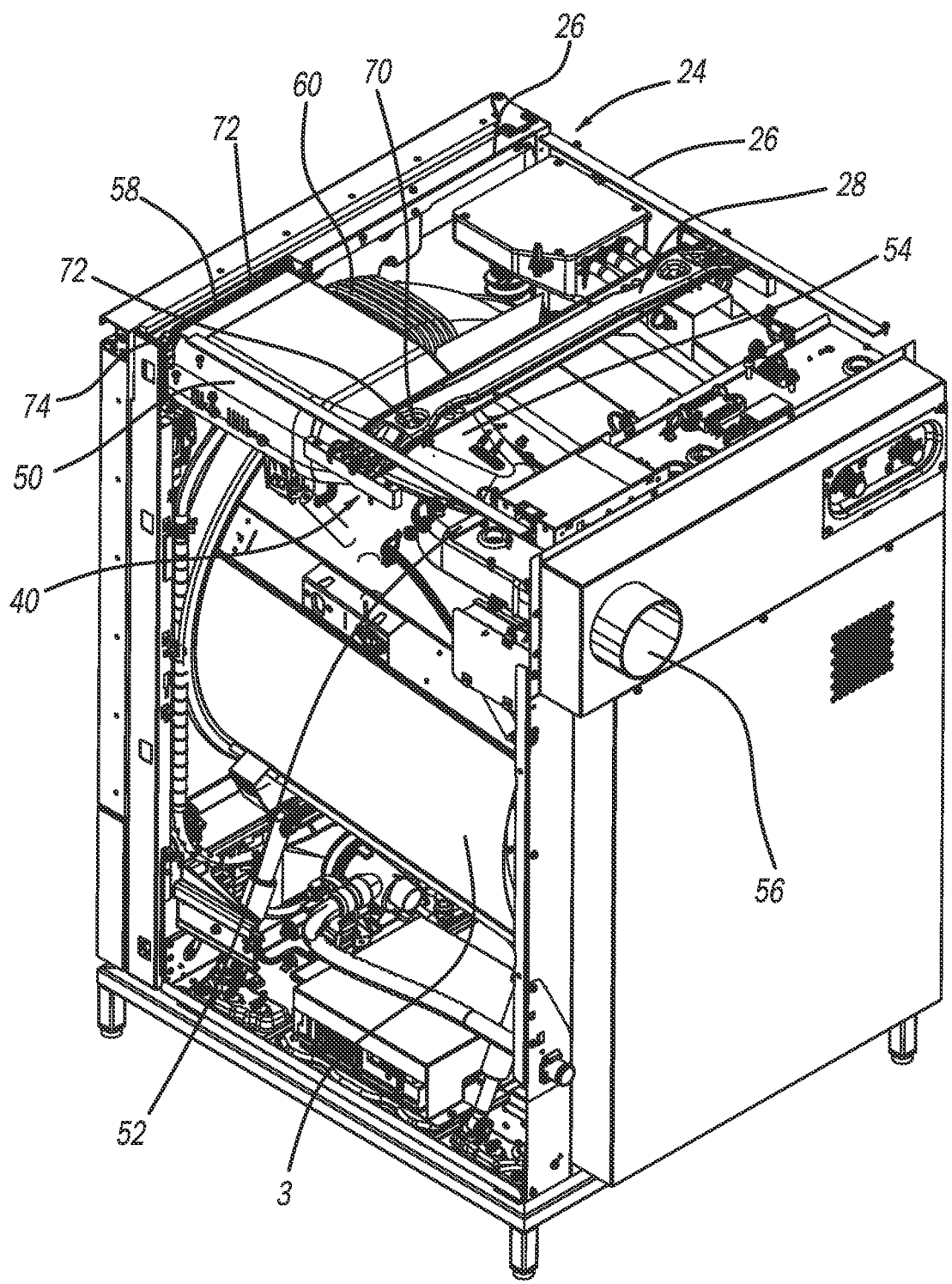
FIG. 5 is a perspective view like FIG. 2 with panels removed.
Figure 6:
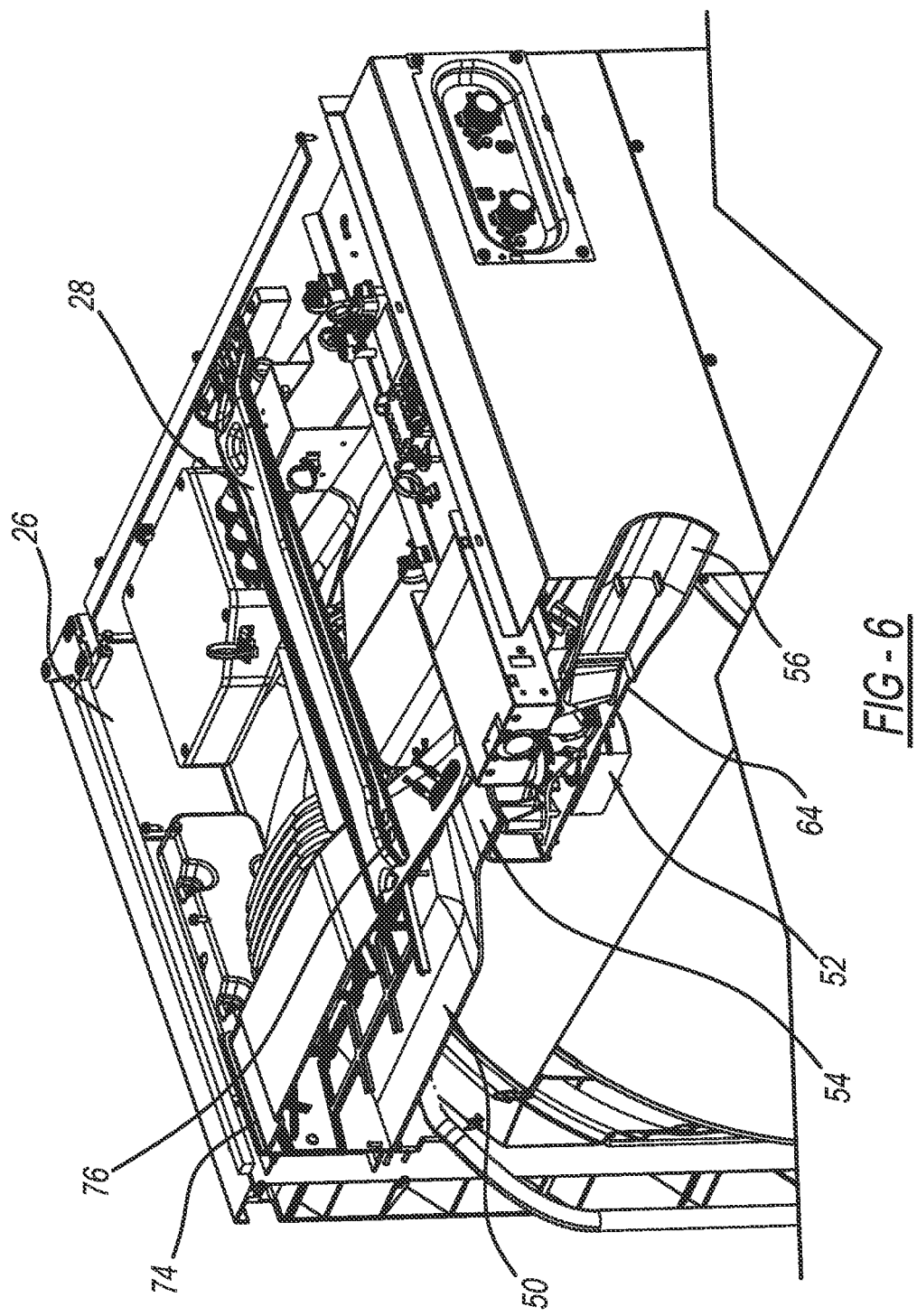
FIG. 6 is a cross-section view of FIG. 5 along lines 6-6 thereof.

Example embodiments will now be described more fully with reference to the accompanying drawings.

Turning to the figures, a combination washer/dryer machine is illustrated and designated with the reference numeral 10. The combination washer/dryer machine 10 includes a plurality of panels 12 that define a housing 14. The front panel includes a door 16 and a control panel 18. The panels 12 form an overall rectangular configuration that houses a drum 20 and tub 22 as well as a washing circuit 23 and drying circuit 25. A framework 24 defines the infrastructure of the housing 14 and secures the panels 12. The framework 24 includes a plurality of beams 26 defining an open rectangular configuration. Additionally, crossbeams 28 span between the rectangular skeleton to enhance the reinforcement and rigidity of the framework 24.

An airflow exhaust system 40 is positioned within a cavity or housing 14. An air exit opening 42 is on the tub 22. Thus, heated air for drying the clothes or textiles within the drum 20 exits through the air exit opening 42 in the tub 22. A flexible duct portion 44 connects the air exit opening 42 with the airflow exhaust system 40.

The airflow exhaust system 40 includes a lint screen box 50 and a centrifugal fan 52. The airflow exhaust system 40 could be a single or multiple parts. The lint screen box 50 is connected with centrifugal fan 52 via a transition duct 54. Additionally, the centrifugal fan 52 includes an outlet 64 connecting to an exhaust tube 56.

The lint screen box 50 is connected by fasteners with the beams 26 of the frame 24. This holds the lint screen box 50 in position on the framework 24. Additionally, the lint screen box includes a drawer 58 adjacent the control panel 18 enabling a lint screen to be removed from the lint screen box 50. Thus, the drawer 58 enables the lint screen to be removed from the lint screen box 50 through the front of the combination washer/dryer machine 10.

The lint screen box 50 includes an inlet 60 that couples with the flexible duct portion 44. Thus, air exiting the tub 22 is directed into the lint screen box 50. The lint screen in the lint screen box 50 removes or catches lint exiting the tub 22 during the clothes drying cycle. The air in the lint screen box 50 is passed through the intermediate or transition duct 54 via the fan 52. The centrifugal fan 52 draws a vacuum from the tub 22 to withdraw the air from the tub 22. The centrifugal fan 52 has an outlet 64 coupled with the exhaust tube 56. Thus, air is drawn from the drum 20 and the tub 22, through the lint screen box 50 and transition duct 54, and exits through the exhaust tube 56. The exhaust tube 56 is then coupled with the interior piping of the residence to exhaust the exhaust air to ambient.

A mounting assembly 70 stationarily secures the airflow exhaust system 40 with the framework 24. A plurality of fasteners 72 are attached to the lint screen box 50 to secure the lint screen box 50 with the framework 24. Also, the lint screen box 50 includes a flange 74 that is positioned inside of an opening in the beam 26. Thus, this additionally holds the lint screen box 50 in a stationary position inside the housing.

A plurality of fasteners 76 extend from the crossbeam 28 to secure the transition duct 54 in a stationary position inside the housing 14. The fasteners 76 may include a bolt and a nut secured on the transition duct 54 or molded into it. Additionally, a bolt could extend from the transition duct 54 and a nut could be positioned on the bolt once the bolt passes through the crossbeam 28. The transition duct 54 is coupled with the centrifugal fan 52. The transition duct 54 connects with the an inlet opening of the fan 52 and is secured with the fan 52 at the inlet opening. This enhances the retention of the fan 52 with the crossbeam 28. The outlet 64 of the fan 52 is coupled with the exhaust tube 56 likewise enhancing the retention of the fan 52 within the housing 14. Additionally, fasteners 76 may pass through the beam 26 to secure with the fan 52 to hold it in position with the exhaust tube 56.

Thus, the airflow exhaust system 40 is stationarily positioned within the housing 14. The fastener 76 and mounting assembly 70 secure the airflow exhaust system 40 with the framework 24 and beams 26, 28. Thus, the airflow exhaust system 40 is prevented from moving during operation of the combination washer/dryer machine 10 during the drying-cycle. This eliminates vibration and noise that is created in prior machines during operation. Additionally, eliminating the movement of the airflow exhaust system 40 reduces wear within the housing 14 to prohibit voids that can create leakage within the housing 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A combination washer/dryer machine, comprising:
   a housing defining a cavity;
   a tub suspended within the cavity of the housing, the tub including an air exit opening;
   a rotatable drum positioned within the tub;
   a framework including a plurality of beams positioned within the cavity of the housing; and
   an airflow exhaust system positioned within the cavity of the housing, the airflow exhaust system including;
   a lint screen box with an inlet;
   a fan arranged in fluid communication with the lint screen box and having an outlet;
   a flexible duct portion extending between and connecting the air exit opening of the tub to the inlet of the lint screen box;
   a transition duct extending between and connecting the lint screen box and the fan; and
   an exhaust tube coupled to the outlet of the fan and extending through the housing,
   wherein both the lint screen box and the transition duct of the airflow exhaust system are stationarily fastened to the framework such that the flexible duct portion is the only component of the airflow exhaust system that moves within the housing with the suspended tub during operation of the combination washer/dryer machine, wherein the lint screen box is secured to at least one of the beams of the framework at a location adjacent to a front panel of the combination washer/dryer.

2. The combination washer/dryer machine of claim 1, further comprising:
   a mounting assembly including a plurality of fasteners coupling the lint screen box and the transition duct of the airflow exhaust system to the framework within the housing.

3. The combination washer/dryer machine of claim 2, wherein the plurality of beams includes at least one crossbeam and the transition duct is secured to the at least one crossbeam via the fasteners.

4. The combination washer/dryer machine of claim 3, wherein the fan is secured in position by the association with the transition duct and the exhaust tube.

5. The combination washer/dryer machine of claim 1, wherein the exhaust tube is configured to be coupled with piping in a residence to exhaust air exiting the exhaust tube to ambient.

6. A combination washer/dryer machine with a front, back, and sides, comprising:
   a housing including a framework, the housing defining a cavity for receiving a drum and a tub positioned inside the housing;
   a door coupled with the housing enabling access to the drum;
   a lint screen box position inside the cavity of the housing;
   a fan arranged in fluid communications with the lint screen box;
   a flexible duct portion connecting the lint screen box with an air exit opening on the tub;
   a transition duct connecting the lint screen box with the fan; and
   an exhaust tube that extends through the housing and connects with the fan, wherein the lint screen box, the fan, and the transition duct are stationarily fastened to the framework and do not move within the housing during operation of the combination washer/dryer machine, wherein the framework includes a plurality of beams and crossbeams positioned in the housing, wherein the lint screen box is secured to at least one of the beams and crossbeams in the framework at a location adjacent to the front of the combination washer/dryer machine.

7. The combination washer/dryer machine of claim 6, wherein the housing includes a plurality of panels secured to the framework.

8. The combination washer/dryer machine of claim 7, wherein the door is positioned on one of the panels.

9. The combination washer/dryer machine of claim 8, wherein the door is positioned on the front of the combination washer/dryer machine.

10. The combination washer/dryer machine of claim 7, wherein the exhaust tube extends from one of the panels opposite to the door.

11. The combination washer/dryer of claim 6, further comprising:
a plurality of fasteners coupling each of the lint screen box, fan, and transition duct to the framework of the housing.

12. The combination washer/dryer machine of claim 11, wherein the transition duct is secured to at least one of the crossbeams in the framework via the fasteners.

13. The combination washer/dryer machine of claim 11, wherein the fan is secured in position by the association with the transition duct and the exhaust tube and is secured to at least one of beams in the framework via the fasteners.

14. The combination washer/dryer machine of claim 6, wherein the exhaust tube is configured to be coupled with piping to exhaust air exiting the exhaust tube to ambient.

* * * * *